US012499856B2

(12) United States Patent
Sisson

(10) Patent No.: US 12,499,856 B2
(45) Date of Patent: Dec. 16, 2025

(54) STRINGED INSTRUMENT

(71) Applicant: Robert Sisson, Oklahoma City, OK (US)

(72) Inventor: Robert Sisson, Oklahoma City, OK (US)

( * ) Notice: Subject to any disclaimer, the term of this patent is extended or adjusted under 35 U.S.C. 154(b) by 307 days.

(21) Appl. No.: 18/445,215

(22) Filed: May 31, 2023

(65) Prior Publication Data

US 2024/0404490 A1 Dec. 5, 2024

(51) Int. Cl.

| | |
|---|---|
| ***G10D 3/14*** | (2020.01) |
| ***G10D 1/08*** | (2006.01) |
| ***G10D 3/04*** | (2020.01) |
| ***G10D 3/10*** | (2006.01) |
| ***G10D 3/12*** | (2020.01) |

(52) U.S. Cl.

CPC ............... *G10D 3/14* (2013.01); *G10D 1/085* (2013.01); *G10D 3/04* (2013.01); *G10D 3/10* (2013.01); *G10D 3/12* (2013.01)

(58) Field of Classification Search

CPC ............ G10D 3/14; G10D 1/085; G10D 3/04; G10D 3/10; G10D 3/12; G10D 1/08

See application file for complete search history.

(56) References Cited

U.S. PATENT DOCUMENTS

| | | | | |
|---|---|---|---|---|
| 5,175,387 | A | 12/1992 | Greory | |
| 5,750,910 | A | 5/1998 | LoJacono | |
| 2005/0011333 | A1 * | 1/2005 | Murrell | G10D 1/08 84/312 R |
| 2005/0011334 | A1 | 1/2005 | Murrell | |
| 2006/0179999 | A1 | 8/2006 | LaMarra | |
| 2010/0319514 | A1 | 12/2010 | Aires | |
| 2019/0362694 | A1 * | 11/2019 | Dickinson | G10D 1/08 |
| 2022/0013095 | A1 | 1/2022 | Steinberger | |
| 2022/0084485 | A1 | 3/2022 | Colon | |
| 2022/0335912 | A1 | 10/2022 | Boehnlein | |

FOREIGN PATENT DOCUMENTS

| | | |
|---|---|---|
| WO | WO 90/04248 | 4/1990 |

* cited by examiner

*Primary Examiner* — Kimberly R Lockett

(74) *Attorney, Agent, or Firm* — Randal D. Homburg

(57) ABSTRACT

An acoustic or electric six stringed instrument forming unique hardware and string defining a pair of redundant low toned strings, a redundant higher tuned string of different gauge, a singular tuned string which is a third, fourth or fifth tuning of the first three, and two redundant high toned strings, tuned to the same note as the first three strings except for being a higher octave and smaller gauge, with hardware and structural component articles custom and unique to support this six stringed instrument using this unique tuning and string gauge combination which is not provided for nor contemplated in any other six stringed instrument.

12 Claims, 9 Drawing Sheets

STRINGED INSTRUMENT

I. BACKGROUND OF THE INVENTION

1. Field of Invention

An acoustic or electric six stringed Suitar provides the hardware and strings to produce the six stringed instrument strung to present a first and second redundant low same-toned and diameter strings, a third redundant string of the same note, a fourth singular tuned string tuned to a third, fourth or fifth tone as the first three, and a fifth and sixth redundant strings, tuned to the same note as the first three strings of a higher octave, providing six strings with five same tuned strings of three different gauges, and one singular toned string (fourth string) of a tuned distinctly from the other five strings and of a distinct gauge, with a unique bridge, nut and tuning keys and capstan uniquely suited for this particular six stringed instrument which is not provided for nor contemplated in any other six stringed instrument.

2. Description of Prior Art

A preliminary review of prior art patents was conducted by the applicant which reveal prior art patents in a similar field or having similar use. However, the prior art inventions do not disclose the same or similar elements as the present six stringed instrument, nor do they present the material components in a manner contemplated or anticipated in the prior art.

While the present invention has the appearance similar to a standard six string guitar, several distinctions in unanticipated structure, component and function are presented over the prior art. We can identify a bridge on the common guitar in US Patent Application No. 2022/0335912 to Boehnlein having adjustment on each string for shaping the bridge for precision tuning. We can identify a modified nut in U.S. Patent Application No. 2022/0084485 to Colon, which provides improved intonation of each string regardless of string gauge providing interchangeable saddles featuring different intonation portions equal to the number of strings on the instrument. We identify that a novel calibrated vibrato, otherwise referenced as a tremolo or "whammy bar" is shown in U.S. Patent Application No. 2022/0013095 to Steinberger, which also includes a modified nut, pre-set string guides with particular offsets and heights for different types of strings.

There are many stringed instrument which provide a variety of framework, string numbers, string compositions, methods and manners of play, and structural variations, including but not limited to the Appalachian Dulcimer, Autoharp, Bağlama, Bajo Quinto/Sexton, Balalaika, Bandola, Bandurria, Banjo, Barbitos, Bass guitar, Berimbau, Biwa, Bouzouki, Bulbul Tarang, Cavaquinho, Cello, Chapman stick, Charango, Charanguita, Cheng, Chillador, Cifteli, Cinco, Classical Kemancha, Clavichord, Clavinet, Craviola, Cuatro, Cumbus, Double Bass, Dutar, Ektara, Epigonion, Guitar, Guitarra Baiana, Guitarra de Golpe, Guitarrón, Guitarrón Chileno, Guitarrón Cuyano, Guzheng, Hammered Dulcimer, Harp, Harpsichord, Hatun Charango, Hualaycho, Hurdy Gurdy, Kamancheh, Kannel, Kantele, Kemancha, Khonkhota, Kitara, Kokyu, Kopuz, Kora, Koto, Lap steel guitar, Lavta, Lute, Lyre, Mandolin, Oud, Phorminx, Psaltery, Qanun, Quirquincho, Ranka Charango, Rubab, Requinto, Ronroco, Sanshin, Santoor, Sarod, Shamisen, Sitar, Sou, Strumstick, Surbahar, Tambura, Tanbur, Tar, Tiple, Tremolo, Tumbi, Tuntuna, Ukulele, Veena, Vihuela, Viola, Violin, Yazh, and Zither. While all considered "stringed instruments", they are all unique and distinct from one another, although having some similarities, as does the present six stringed instrument.

This being noted, there are no stringed instruments that provide the customized nut, bridge, tuning features and structural components of the present six stringed instrument which is identified in the specification and claims below.

II. SUMMARY OF THE INVENTION

The present disclosed six stringed instrument represents a new device which are built on a similar frame as a guitar, with the exceptions of offering a redundancy of a common tone of different octaves on five of the strings, and a sixth string being tuned to a $3^{rd}$, $4^{th}$ or $5^{th}$ of the other five strings. In this six stringed instrument, a novel nut, bridge and tuning keys and their respective tuning mechanism are required to accept the six strings and their required unique combination over traditional six or twelve stringed guitars. The present six stringed instrument may be presented as an acoustic or an electric six stringed instrument. The distinctions over the prior art devices include:

- A relative tuning from high to low of C-C-C-F-C-C, C-C-C-G-C-C, or C-C-C-A-C-C, with the anticipation of scalar instruments based upon the same relative tuning with fret spacing/fretboard scale length optimized for the tuning of the instrument, providing the lower tones benefit intonationally for longer fretboard scale lengths and higher pitched tuning benefits intonationally for shorter fretboard lengths.
- Use with a tremolo in both acoustic or electric.
- A unique nut which allows for the inclusion of the appropriate string from top to bottom with a 0.001 mm slot more than each string, optionally employing a grease to reduce friction for each string to freely slide within each respective slot in the nut.
- Key specific embodiments, which would involve the instrument strung to any note for the 5 strings, with the sixth string tuned to a respective $3^{rd}$, $4^{th}$ or $5^{th}$ (eg. A-A-A-C-A-A, A-A-A-D-A-A, or A-A-A-E-A-A).
- A modified bridge and bridge adjustment mechanism for fine tuning each string for a 2-1-1-2 string diameter instead of a guitar string supplied in a 1-1-1-1-1-1 diameter.
- In the acoustic embodiment of the Suitar, a novel "ZAG" bridge which is not present in a traditional six string or twelve string acoustic guitar, having a standard tuning of E-A-D-G-B-E with variation of different tuning and strings of diminishing diameters from low to high to commonly align the saddle of the ZAG bridge to provide redundant string on a common plane, the bridge in the guitar being provided in a straight slant reduced from low to high.

III. DESCRIPTION OF THE DRAWINGS

The following drawings are submitted with this utility patent application.

FIG. 8 is a present cross sectional drawing of the Suitar neck and strings along section lines 8/8 of FIG. 1.

FIG. 13 is a sectional view of the Zag bridge along section lines 13/13 of FIG. 12.

IV. DESCRIPTION OF THE PREFERRED EMBODIMENT

Figure 1:
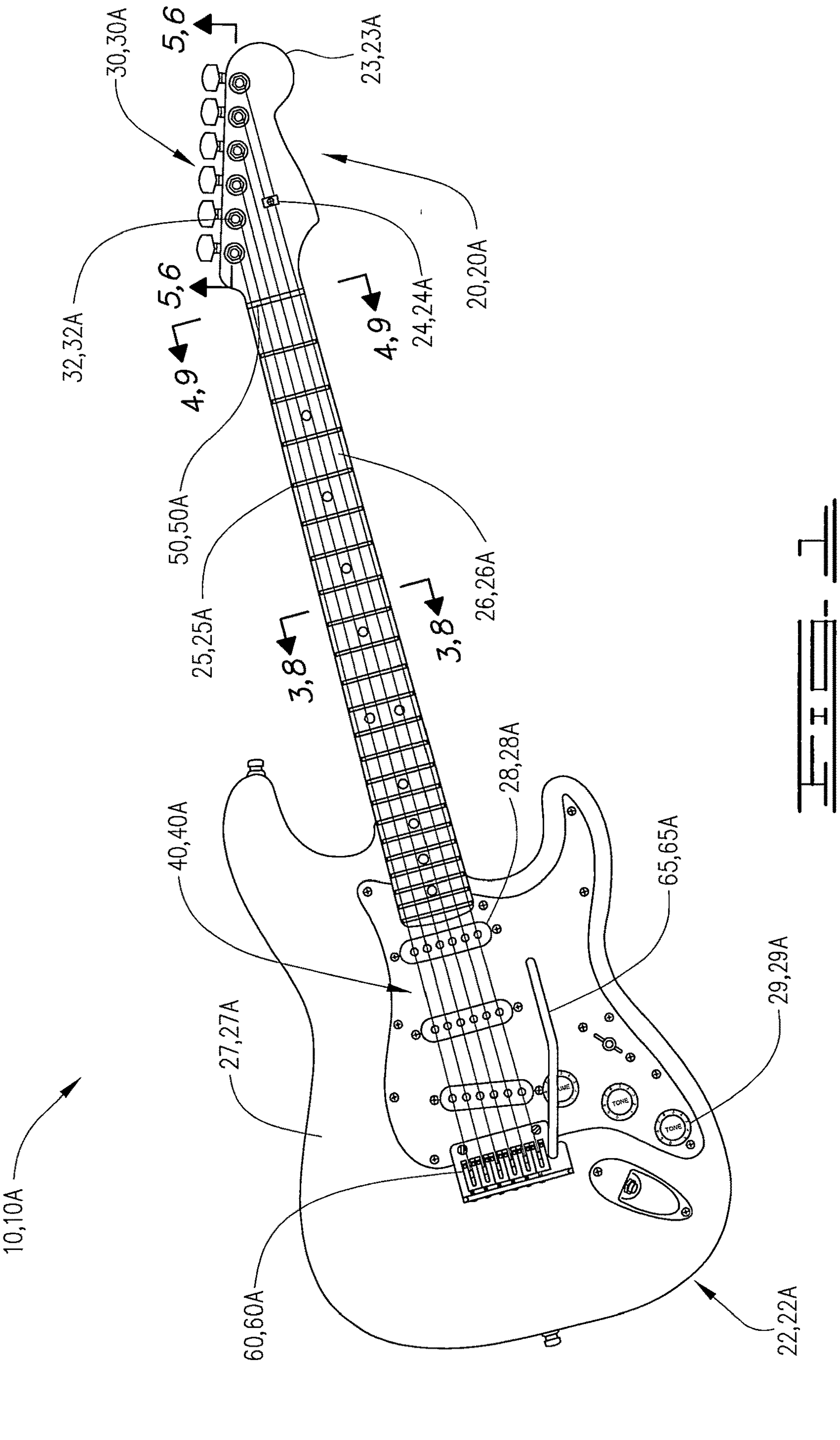
FIG. 1 is a diagram of a prior art guitar and the Suitar six stringed instrument showing the common referenced general referenced components.
Figure 2:
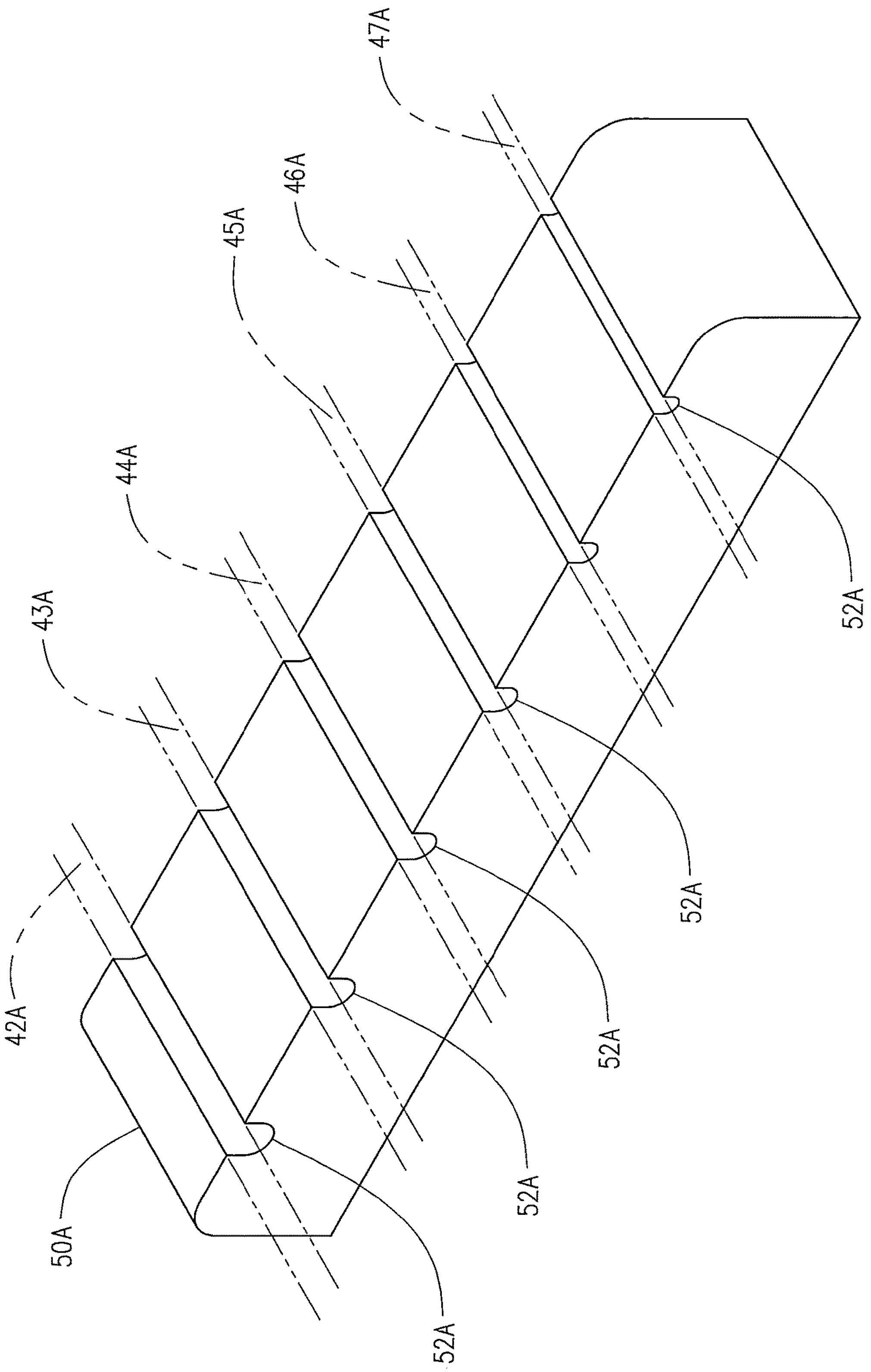
FIG. 2 PRIOR ART
FIG. 2 is a prior art drawing of the guitar nut with phantom lines representing the strings of a guitar.
Figure 3:
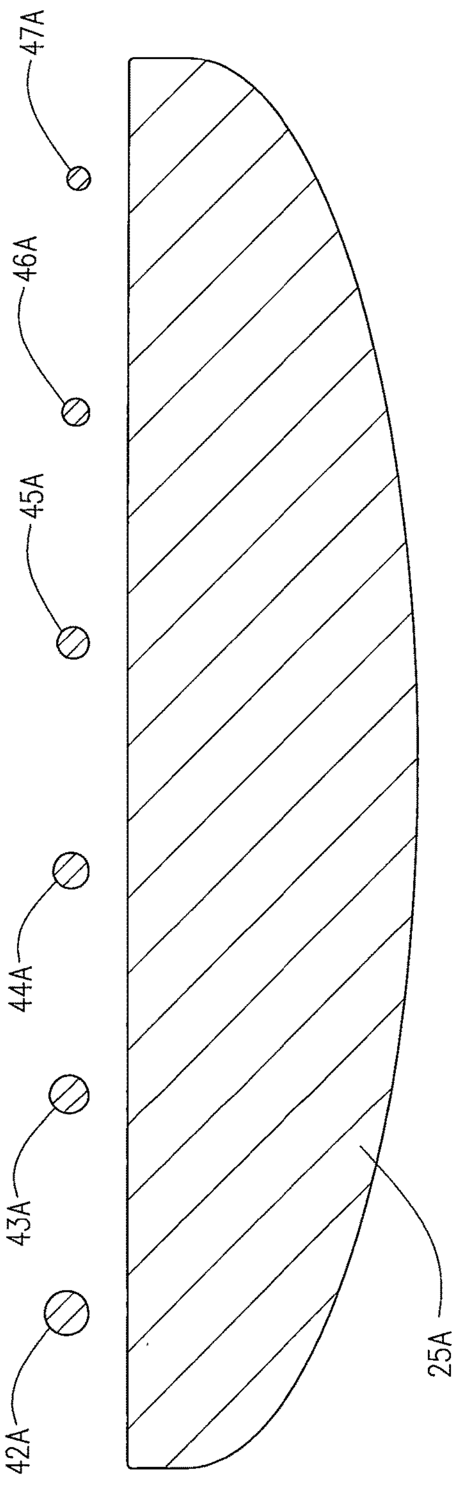
FIG-3 PRIOR ART
FIG. 3 is a prior art cross sectional drawing of a guitar neck and strings along section lines 3/3 of FIG. 1.
Figure 4:
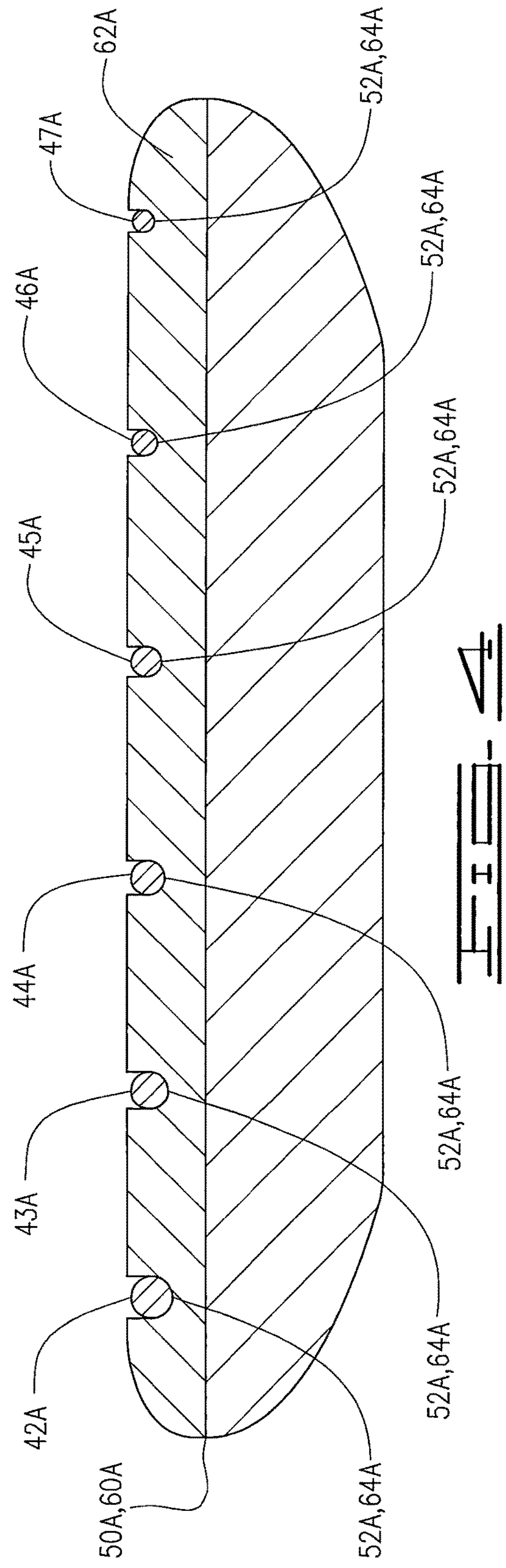
FIG-4 PRIOR ART
FIG. 4 is a prior art cross sectional drawing of the nut and strings of a guitar along section lines 4/4 of FIG. 1.

A six stringed instrument, presently referenced as a Suitar (pronounce "Swi-tar" or "C-tar") 10 provides a unique stringing combination, with unique bridges, nuts and corresponding nut slot widths and depths, tuners, capstans and head structures required to work with the unique string combinations, widths and depth requirements, necks, and for acoustic embodiments, bridge pins and anchoring to the body. This Suitar 10 cannot be a simple detuned guitar 10A, because the strings are not able to be tuned to the same notes and the strings are not redundant where they are such on the Suitar 10, the guitar 10A lacking the proper function, tonal quality and play. A guitar 10A also cannot simply replace its strings without applying the Suitar specific bridge 60 and Suitar specific nut 50 required in the Suitar 10. The prior art guitar 10A is shown in FIGS. 1-5 (numbered reference "A") of the drawings and the Suitar 10 is shown in FIGS. 1 and 6-10, (numbered without letter designation).

The most important distinction over prior art is the stringing applications, as shown in FIGS. 1-10 of the drawing figures, distinguishing between the distinctly different components as illustrated. As disclosed in FIGS. 7-9, the applied strings 40 included two large diameter and width $1^{st}$ and 2nd redundant strings 42, 43 of a first pitch, one medium diameter and width $3^{rd}$ string 44 of the same first pitch, a medium diameter and width $4^{th}$ string 45 of a second pitch which is either a $3^{rd}$, $4^{th}$ or $5^{th}$ higher than the first pitch, and two small diameter and width $5^{th}$ and $6^{th}$ redundant strings 46, 47 of the first pitch, only a higher octave. This string combination may be used in any key, with strings 1, 2, 3, 5 and 6 tuned to any base note and the fourth string tuned to the $3^{rd}$, $4^{th}$ or $5^{th}$ of the base note. As referenced in this application for ease of discussion, the string combination is C for the five common strings 42, 43, 44, 46 and 47, and the $4^{th}$ string 45 is tuned to a G—which is a $4^{th}$ of the C tuned base strings, although it is intended that the base note could be an A, B, C, D, E, F or G, and any sharp or flat of those notes for the five redundant strings/pitches. The scale length of the Suitar is determined by which pitch the five redundant strings are tuned to. Lower notes means a longer scale length while a higher pitched five redundant notes requires a shorter scale length for optimized intonation across to full length of the fretboard.

Figure 7:
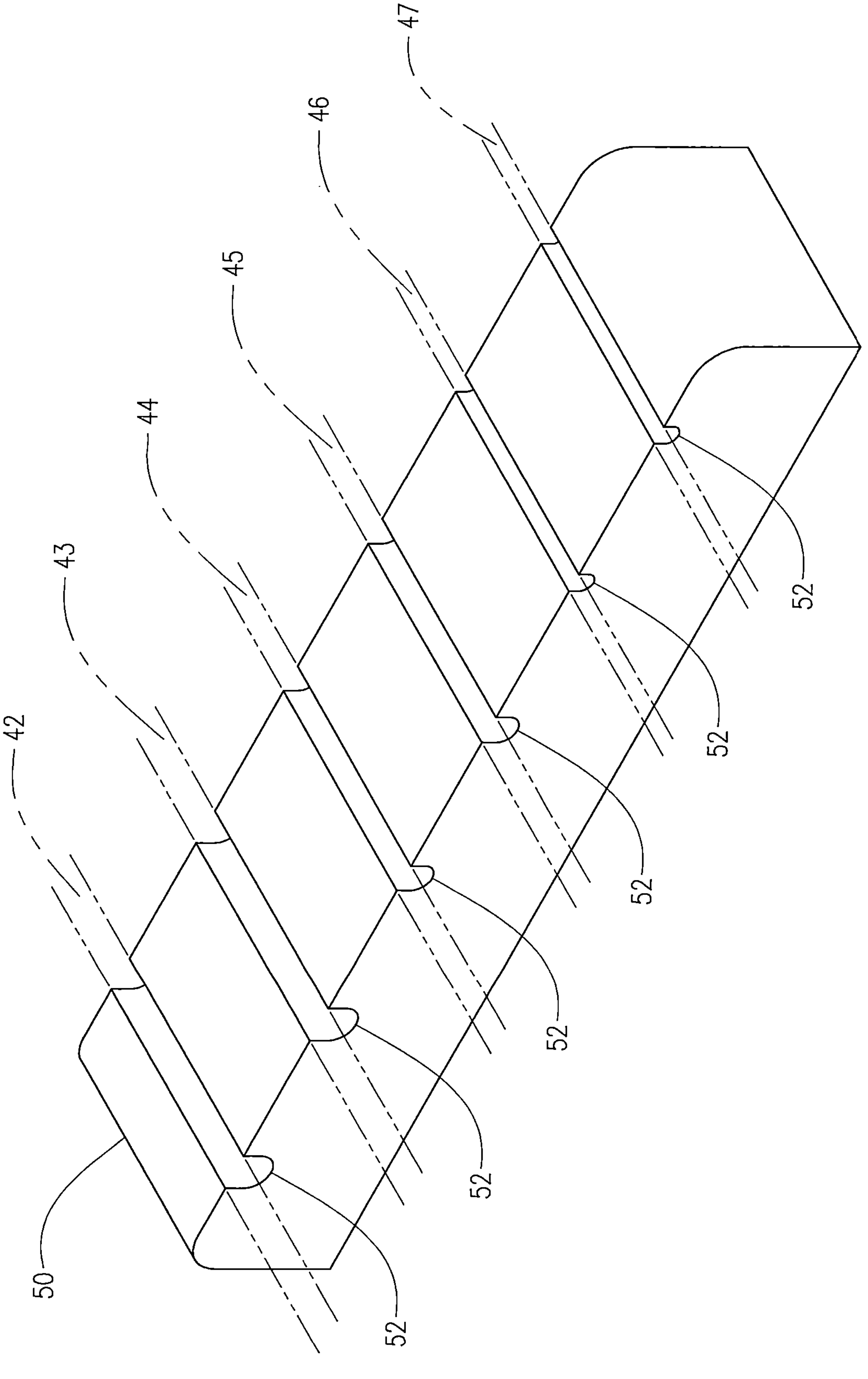
FIG. 7 is a present cross sectional drawing of the Suitar nut with phantom lines representing the Suitar strings.

Thus, the nut 50, FIG. 7, needs to be cut to accomplish the delivery of this Suitar with tonal quality and to be size matched to the relative tuning of model of Suitar made based on the five redundant strings. It is known by those skilled in the art that the nuts 50 and nuts slots 52 are cut to accept each respective string within the slot with a cradle clearance of 0.01 mm or 0.001 inches, FIG. 10, X being the slot clearance between the string width Y and the slot width Z. It is therefore required that a novel nut 50, FIG. 7, is used to accept the 2-1-1-2 string widths, with the respective nut slots contoured to accept each string diameter Y with this required slot width Z overage X. If the nut slot width Z is too tight, the string is difficult if not impossible to tune and also stretch or bend by the player and will make unwanted noises and will keep a whammy bar 65 from returning to tune. It is helpful to apply a grease 55 within the slot clearance X to eliminate any friction noise in embodiments of the Suitar 10 which include a whammy bar 65, FIG. 10. If the nut slot width Z is too wide, the string "buzzes" or resonates too much, causing the string to move too much laterally, causing the string to generate unwanted unmusical noises and causes the player to be unsure of where the string is in space and time.

Figure 9:
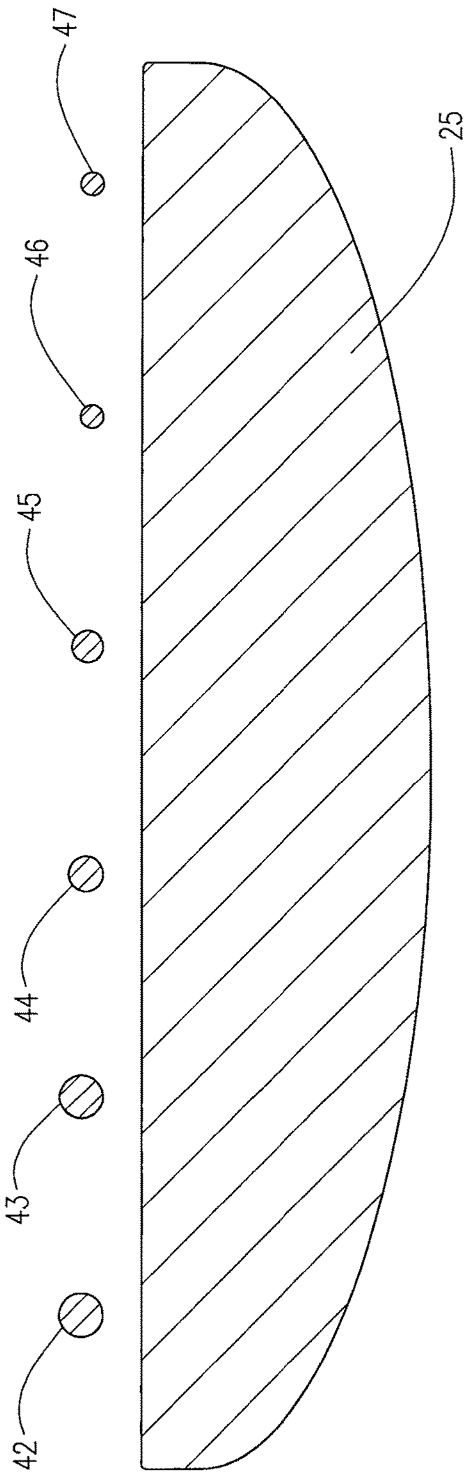
FIG. 9 is a present cross sectional drawing of the Suitar nut and strings along section lines 9/9 of FIG. 1.
Figure 10:
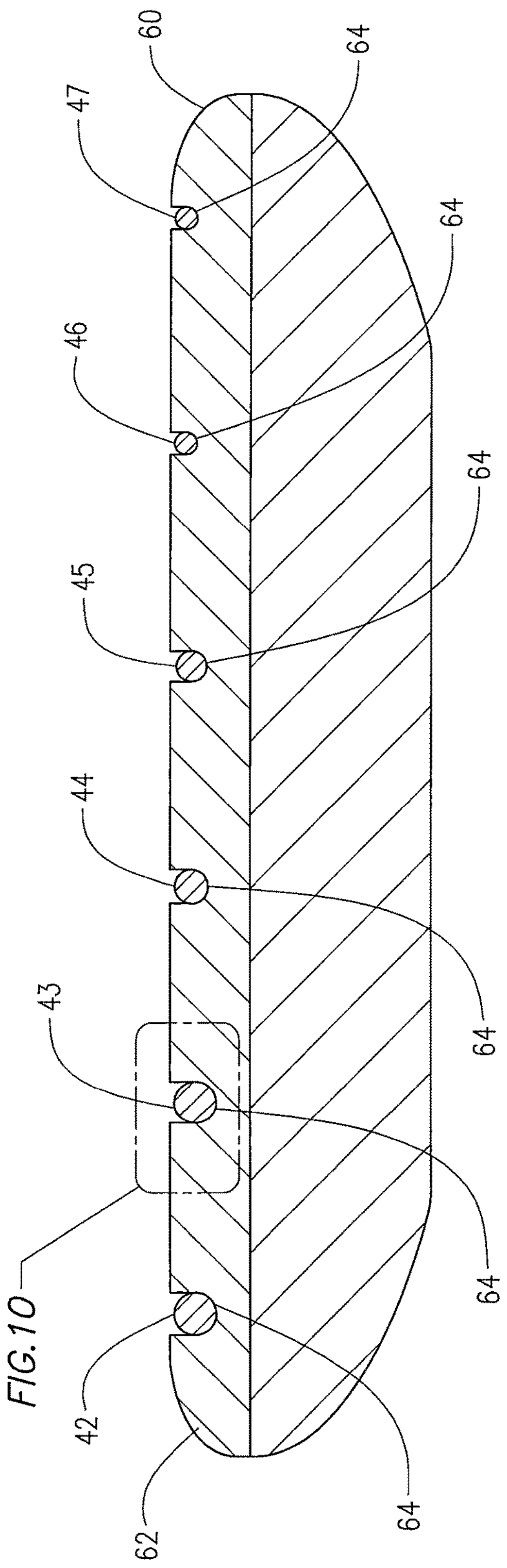
FIG. 10 is a close-up sectional view of a string seated within a slot of the nut on the Suitar indicating width comparisons and the application of the grease and/or lubricant from the broken line window of FIG. 9.
Figure 10:
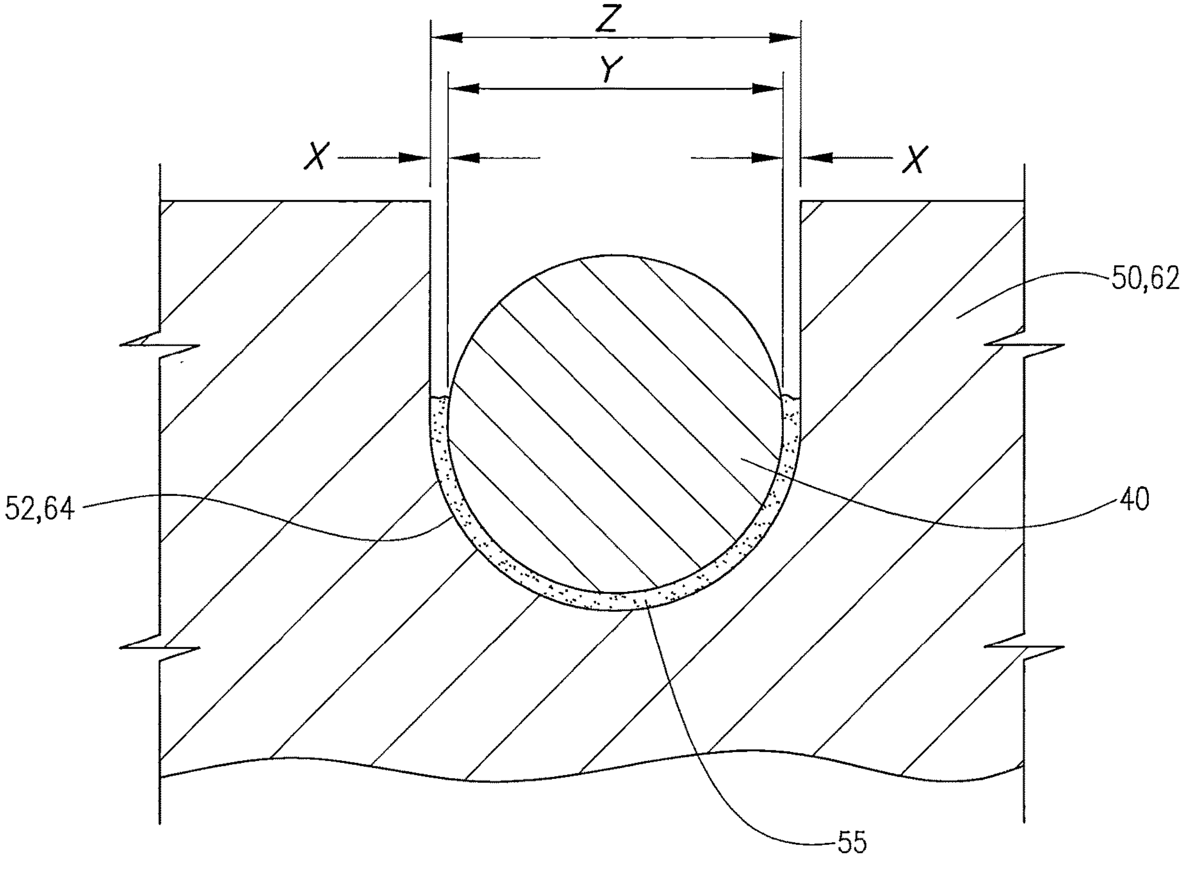

The same distinction arises with the bridge 60, FIG. 9, electric or acoustic. The bridge 60 is mounted to the body 27 of the instrument in the electric embodiment of the Suitar may be provided with additional fine tuning means as demonstrated in the Boehnlein patent, with individual string bridge mounts being moved forward towards the head or backward towards the lower bout or lower end of the body for precision tuning in addition to the overall tuning accomplished by the tuners 30 at the capstan 32 mounting of each string 40. In the acoustic embodiment of the Suitar, the saddle 62 of the bridge 60, FIG. 9, is provided for the 2-1-1-2 string combination along with modified pegs installed within the bridge 60 to anchor each respective string 40 to the bridge Each peg and saddle would require the same clearance in width for each respective saddle slot and peg corresponding to each string of the Suitar acoustic embodiment.

Figure 11:
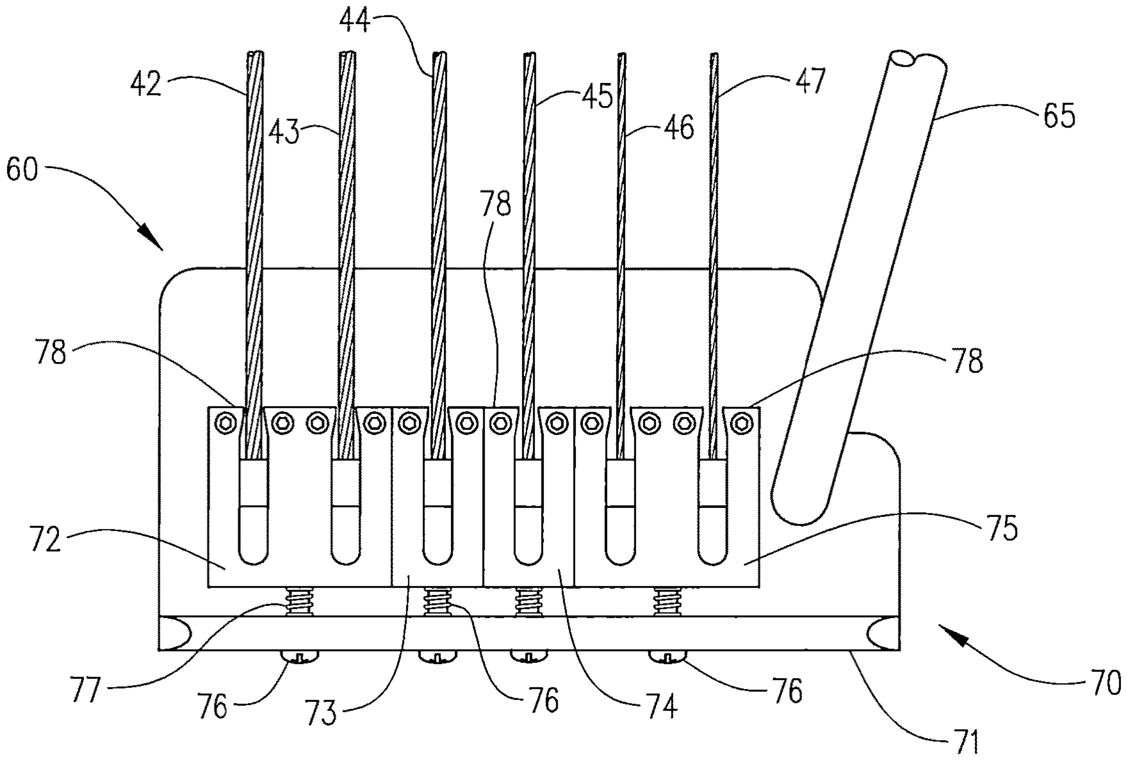
FIG. 11 is a top view of the bridge on an electric Suitar indicating a bridge tuning assembly with the four tuning blocks, two being provided for the redundant string pairs and two for the two single strings.
Figure 12:
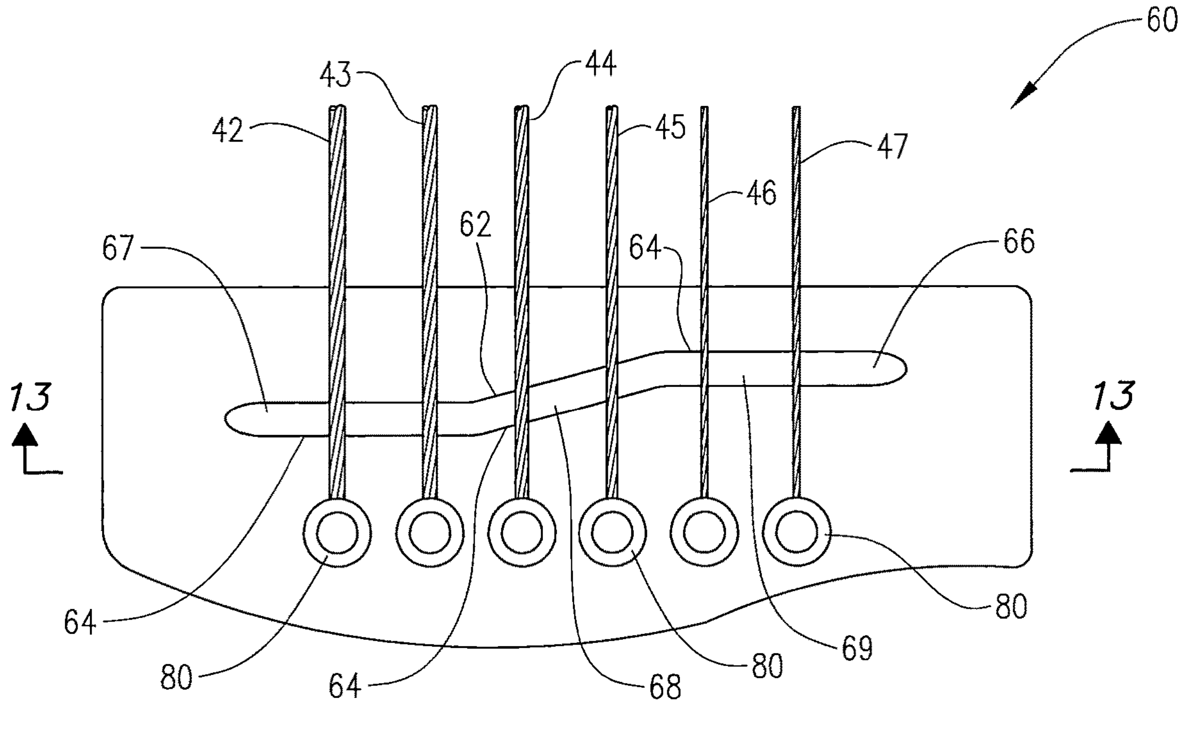
FIG. 12 is a top view of a Zag bridge on an acoustic guitar with the applied strings and installed pegs.
Figure 3:
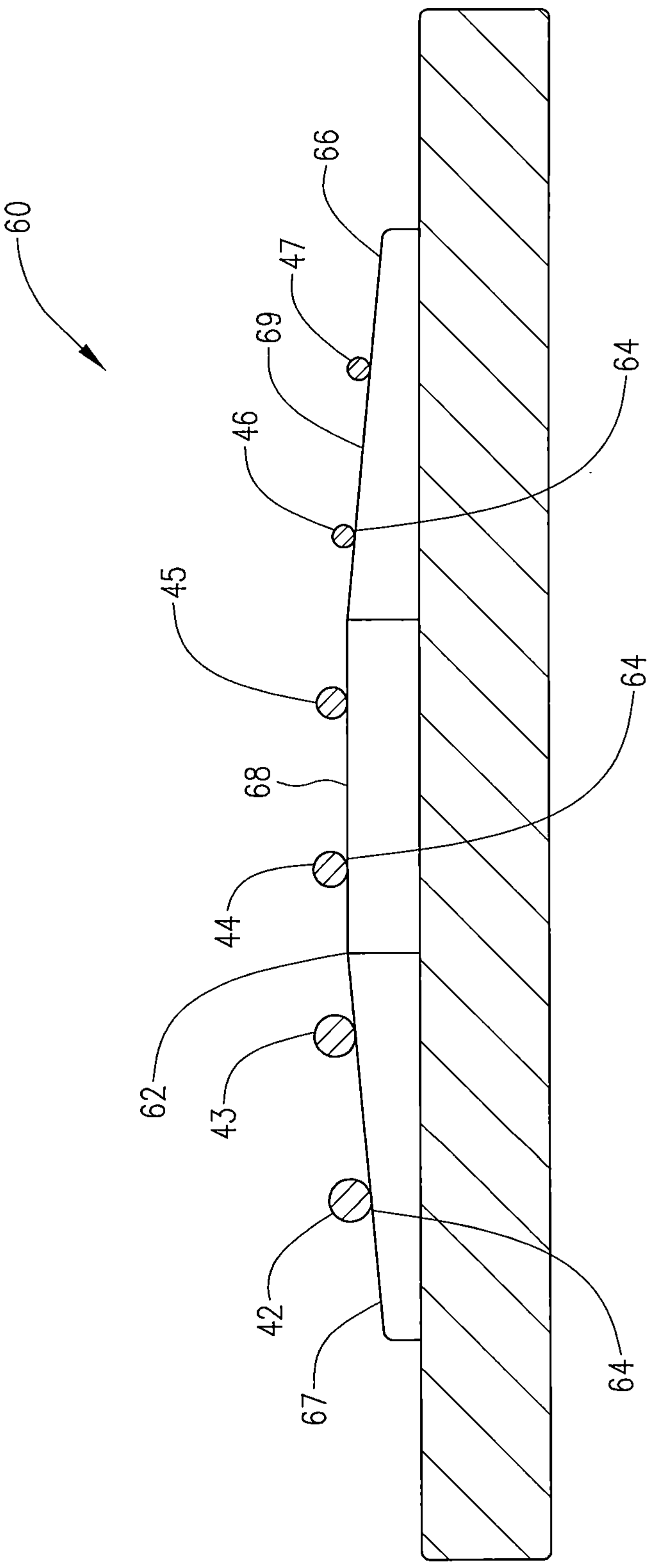

More specifically, as indicated in FIGS. 11 and 12, a specific embodiment of a bridge 60 for the electric Suitar and an acoustic Sitar are illustrated, respectively. In the electric embodiment, FIG. 11, An electric tuning assembly 70 defines a bracket base 71, independently slidibly engaging a first and second string tuning block 72, a third string tuning block 73, a fourth string tuning block 74 and a fifth and sixth string tuning block 75. Each respective tuning block independently secures the relative string 40 within the tuning block using a string clamp 78. The adjustment of each tuning block is performed by a tuning screw threadably engaging the bracket base, with expanding bias provide upon each tuning screw 76 by a respective tuning spring 77, allowing each respective tuning block 72, 73, 74, and 75, to be individually extended or retracted within the bridge tuning assembly 70. This is vital to the intonation of the strings to accomplish the tuned sound of the strings when played together. The first and second string tuning block 72 enforce the identical microtuning of the two redundant lowest strings, 42, 43, while independently micro tuning the individual third string tuning block 73 and its engaged third string 44, independently microtuning the individual fourth string tuning block 74 and its engaged fourth string 45, and microtuning the redundant fifth and sixth tuning block 75 and its engaged fifth and sixth strings, 46, 47 contemporaneously.

For an acoustic Suitar, FIGS. 12 and 13, the instrument provides a novel Zag bridge 66, defining a low linear section 67, a middle slant section 68 and a high linear section 69, wherein the saddle slots 64 are defined within the saddle 62, with the two low redundant strings 42, 43, located in respective saddle slots in the low linear section 67, the third and fourth strings 44, 45, located in respective saddle slots 64 in the middle slant section 68, and the two high redundant fifth and sixth strings 46, 47, located in the respective saddle slots 64 in the high linear section 69, as shown in FIGS. 12 and 13. It should be understood that FIGS. 11-13, are presented to indicate a single respective visual embodiment and the bridge tuning assembly and Zag bridge 66 may be modified to any extend provided the functional capacity and presented overall design aspects are followed where they affect functional and novel features of the Suitar. The functional purpose of the aligned low linear section 67 is to cause the two low redundant strings 42, 43 to be tonally and harmonically identical, as is the purpose for the high linear section 69 is to cause the same tonal harmony and tonal identity for the two high redundant strings 46, 47, since they are the same diameter and tuned paired strings. It is not merely a cosmetic or design feature, although distinguished from any prior art acoustic bridge.

The other components of the 10 Suitar include features similar to a guitar 10A, FIG. 1, including from the top down, the head 23, 23A, including the tuners 30, 30A, string tree 24, 24A, neck 25, 25A with frets 26, 26A or without frets (not shown), extending the head 23, 23A at a top end 20, 20A, the body 27, 27A mounting the bottom end 22, 22A of the neck, pickups 28, 28A or no pickups for an acoustic version (not shown), and controls 29, 29A, on the electric or a sound hole for the acoustic version (not shown). Unique and distinguished in the Suitar 10 are the scale lengths that are relative tuning specific, specific strings 40, specific nut 50 and nut slots 52, the bridge 60, the tuners 30 and capstans 32 modified to accept each respective string with the distinct string diameters Y, contrasting FIGS. 2-5 and 6-9.

As previously indicated, the strings 40A on a guitar 10A have a string diameter and tone as follows: E 42A (low)—0.038 to 0.054 inches, A 43A—0.030 to 0.042 inches, D 44A—0.021 to 0.032 inches, 45A G—0.015 to 0.020, B 46A—0.010 to 0.016 inches, and E 47A (high) 0.008 to 0.012 inches, FIGS. 2-5.

The strings 40 on the Suitar 10 are as follows (For the 'C"' redundant five strings model): C (lowest 1$^{st}$ string 42)—0.0545±0.01, C—(2$^{nd}$ string 43) same as first string, C (3$^{rd}$ string 44)—0.0230±0.01, G (4$^{th}$ string 45)—0.0140±0.01, C (5$^{th}$ string 46)—0.0100±0.01, and C (6$^{th}$ string 47) same as the 5$^{th}$ string. The nut 50 and bridge 60 on the Suitar 10 are measured and cut at 0.001-0.002 as previously indicated, FIGS. 6-10.

The above variance on the string diameters is for the user to select the gauge of the strings as preferred for the user, which are classified and manufactured using common industry identifying phrasing of "Super Extra Light", "Super Light", "Light", "Medium" or "Heavy". The variance is also given to offer a difference between the acoustic string and the electric string, metal or nylon strings, or the mode and genre of music the user elects to play. Multiple Suitars 10 may be made for each different key or selected string type, which is also currently common to the industry where artists have multiple guitars 10A on stage tuned differently or intended to produce different fingerings sounds for different songs during a performance.

Figure 5:
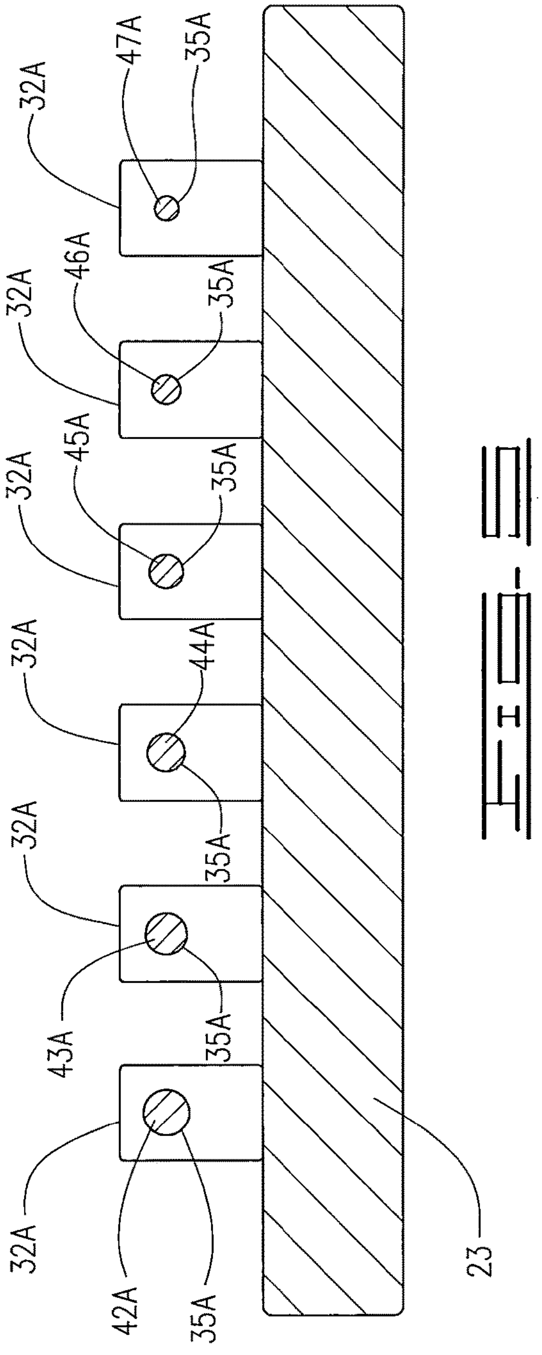
FIG. 5 PRIOR ART
FIG. 5 is a prior art cross sectional drawing of the capstans and transvers string openings of a guitar along section lines 5/5 of FIG. 1.
Figure 6:
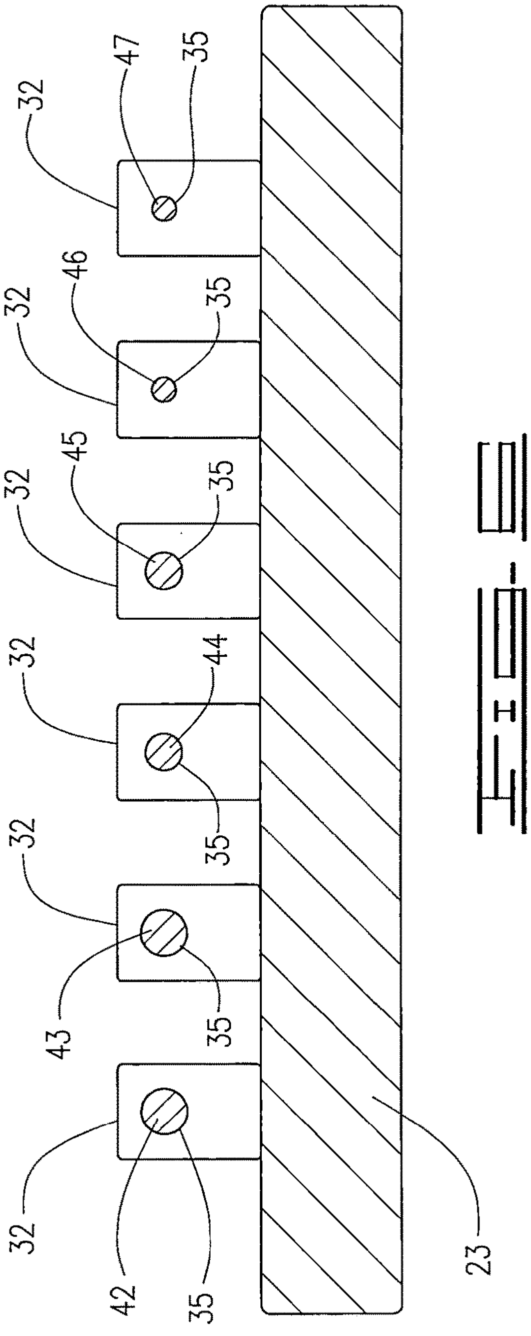
FIG. 6 is a present cross sectional drawing of the capstans and transverse string openings of the Suitar along section lines 6/6 of FIG. 1.

Capstans 32 and tuning keys, or tuners 30, FIGS. 5-6, are unique for the Suitar 10, as indicated above. Each capstan 32 has a respective transverse string opening 35 through the each respective capstan 32 extending above the upper surface of the head 23 to accept an upper portion of respective string 40. Since the Suitar 10 has respective diameters providing two redundant large strings 42, 43, two medium different strings 44, 45, and two redundant small strings 46, 47, the capstans are located with respective transverse string opening to allow for the insertion of the string with no more than a 0.010 inch clearance so that the string may be retained upon the capstan 32 upon installation with a few wraps around the respective capstan 32, allowing for precision tuning and retention of the string without slipping out of the respective transverse string opening 35 in each capstan 32. Additionally, it may be required to modify and/or strengthen the tuning keys 30 to accommodate the Suitar 10 string application.

While the Suitar 10 has been particularly shown and described with reference to a preferred embodiment thereof, it will be understood by those skilled in the art that changes in form and detail may be made therein without departing from the spirit and scope of the invention.

What is claimed is:

1. A six string electric musical instrument comprising:

a top end defining a head with six tuning keys extending capstans with individual transverse string openings;

a neck attached to said head further attaching to a body;

a nut extending between said head and neck, a bridge extending from said body aligned with said neck, said bridge comprising a bridge tuning assembly for an electric embodiment defining;

a bracket base;

a first and second string tuning block having a capacity to independently move forward and backwards by using a tuning screw threadably engaging said bracket base, with a biased spring between said first and second string tuning block to urge said first and second string tuning block away from said bracket base, said first and second string tuning block defining a respective string clamp to attached a respective first and second low strings;

a third string tuning block having a capacity to independently move forward and backwards by using a tuning screw threadably engaging said bracket base, with a biased spring between said third string tuning block and said bracket base to urge said third string tuning block away from said bracket base, said third string tuning block defining a respective string clamp to attach a third medium string;

a fourth string tuning block having a capacity to independently move forward and backwards by using a tuning screw threadably engaging said bracket base, with a biased spring between said fourth string tuning block and said bracket base to urge said fourth string tuning block away from said bracket base, said fourth string tuning block defining a respective string clamp to attach a fourth medium string; and a fifth and sixth string tuning block having a capacity to independently move forward and backwards by using a tuning screw threadably engaging said bracket base, with a biased spring between said fifth and sixth string tuning block to urge said fifth and sixth string tuning block away from said bracket base, said fifth and sixth string tuning block defining a respective string clamp to attached a respective fifth and sixth high strings for fine intonation adjustment of said electric six stringed instrument, said first low string attached through a first to a first capstan through a respective transverse string opening extending to said bridge tuned to a preferred note;

said second low string, identical to said first low string attached through a second capstan through a respective transverse string opening extending to said bridge tuned to the same preferred note as said first string;

said third medium string attached to a third capstan through a respective transverse string opening extending to said bridge tuned to the same preferred note as said first and second strings;

said fourth medium string attached to a fourth capstan through a respective transverse string opening extending to said bridge tuned to a scaled third, fourth or fifth of the first, second and third strings as selected by the user depending on a selected song;

said fifth small string attached to a fifth capstan through a respective transverse string opening, extending to said bridge tuned to the same note higher on the scale as the first, second and third strings; and said sixth small string identical to said fifth small string attached to a sixth capstan through a respective transverse string opening to said bridge tuned to the same preferred note as said fifth string, wherein said six string instrument may be played using individual notes or chords derived from strumming two or more strings at a time.

2. The six stringed musical instrument of claim 1, said nut further comprising:

a first nut slot cut within said nut to accept said first string with a cradle clearance of 0.01 mm or 0.001 inches more than said first string seated within said first nut slot;

a second nut slot cut within said nut to accept said second string with a cradle clearance of 0.01 mm or 0.001 inches more than said second string seated within said second nut slot;

a third nut slot cut within said nut to accept said third string with a cradle clearance of 0.01 mm or 0.001 inches more than said third string seated within said third nut slot;

a fourth nut slot cut within said nut to accept said fourth string with a cradle clearance of 0.01 mm or 0.001 inches more than said fourth string seated within said fourth nut slot;

a fifth nut slot cut within said nut to accept said fifth string with a cradle clearance of 0.01 mm or 0.001 inches more than said fifth string seated within said fifth nut slot; and a sixth nut slot cut within said nut to accept said sixth string with a cradle clearance of 0.01 mm or 0.001 inches more than said sixth string seated within said sixth nut slot, wherein said nuts slots and said strings prevent buzzing of said strings when played yet secured each said string while allowing said strings to slide freely back and forth for tuning, bending or when using a slide or whammy bar.

3. The six stringed instrument of claim 1, said six strings defining:

said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter.

4. The six stringed instrument of claim 1, further comprising:

said six strings defining said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter; a first nut slot cut within said nut to accept said first string with a cradle clearance of 0.01 mm or 0.001 inches more than said first string seated within said first nut slot, a second nut slot cut within said nut to accept said second string with a cradle clearance of 0.01 mm or 0.001 inches more than said second string seated within said second nut slot, a third nut slot cut within said nut to accept said third string with a cradle clearance of 0.01 mm or 0.001 inches more than said third string seated within said third nut slot, a fourth nut slot cut within said nut to accept said fourth string with a cradle clearance of 0.01 mm or 0.001 inches more than said fourth string seated within said fourth nut slot, a fifth nut slot cut within said nut to accept said fifth string with a cradle clearance of 0.01 mm or 0.001 inches more than said fifth string seated within said fifth nut slot, and a sixth nut slot cut within said nut to accept said sixth string with a cradle clearance of 0.01 mm or 0.001 inches more than said sixth string seated within said sixth nut slot, wherein said nuts slots and said strings prevent buzzing of said strings when played yet secured each said string while allowing said strings to slide freely back and forth for tuning, bending or when using a slide or whammy bar.

5. The six stringed instrument as disclosed in claim 1, said transverse string openings within each respective capstan having a clearance of 0.010 inches of said respective string inserted through each respective transverse string opening.

6. The six stringed instrument of claim 1, further comprising:

said transverse string openings within each respective capstan having a clearance of 0.010 inches of said respective string inserted through each respective transverse string opening; and said six strings defining said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter.

7. A six string acoustic musical instrument comprising:

a top end defining a head with six tuning keys extending capstans with individual transverse string openings;

a neck attached to said head further attaching to a body;

a nut extending between said head and neck, a Zag bridge extending from said body aligned with said neck, said Zag bridge further comprising a low linear section, a middle slant section and a high linear section, wherein a first string and a second string traverse a saddle of said Zag bridge over said low linear section, a third and a fourth strings traverse a saddle of said Zag bridge over said middle slant section and a fifth and a sixth small strings traverse a saddle of said Zag bridge over said high linear section for improved intonation of said six stringed acoustic instrument;

said first string attached through a first to a first capstan through a respective transverse string opening extending to said bridge tuned to a preferred note;

said second string, identical to said first low string attached through a second capstan through a respective transverse string opening extending to said bridge tuned to the same preferred note as said first string, making said first and second strings redundant;

said third string attached to a third capstan through a respective transverse string opening extending to said bridge tuned to the same preferred note as said first and second strings;

said fourth string attached to a fourth capstan through a respective transverse string opening extending to said bridge tuned to a scaled third, fourth or fifth of the first, second and third strings as selected by the user depending on a selected song;

said fifth small string attached to a fifth capstan through a respective transverse string opening, extending to said bridge tuned to the same note higher on the scale as the first, second and third strings; and said sixth string identical to said fifth small string attached to a sixth capstan through a respective transverse string opening to said bridge tuned to the same preferred note as said fifth string, making said fifth and sixth strings redundant, wherein said six string instrument may be played using individual notes or chords derived from strumming two or more strings at a time.

8. The six stringed musical instrument of claim 7, said nut further comprising:

a first nut slot cut within said nut to accept said first string with a cradle clearance of 0.01 mm or 0.001 inches more than said first string seated within said first nut slot;

a second nut slot cut within said nut to accept said second string with a cradle clearance of 0.01 mm or 0.001 inches more than said second string seated within said second nut slot;

a third nut slot cut within said nut to accept said third string with a cradle clearance of 0.01 mm or 0.001 inches more than said third string seated within said third nut slot;

a fourth nut slot cut within said nut to accept said fourth string with a cradle clearance of 0.01 mm or 0.001 inches more than said fourth string seated within said fourth nut slot;

a fifth nut slot cut within said nut to accept said fifth string with a cradle clearance of 0.01 mm or 0.001 inches more than said fifth string seated within said fifth nut slot; and a sixth nut slot cut within said nut to accept said sixth string with a cradle clearance of 0.01 mm or 0.001 inches more than said sixth string seated within said sixth nut slot, wherein said nuts slots and said strings prevent buzzing of said strings when played yet secured each said string while allowing said strings to slide freely back and forth for tuning, bending or when using a slide or whammy bar.

9. The six stringed instrument of claim 7, said six strings defining:

said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter.

10. The six stringed instrument of claim 7, further comprising:

said six strings defining said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter; a first nut slot cut within said nut to accept said first string with a cradle clearance of 0.01 mm or 0.001 inches more than said first string seated within said first nut slot, a second nut slot cut within said nut to accept said second string with a cradle clearance of 0.01 mm or 0.001 inches more than said second string seated within said second nut slot, a third nut slot cut within said nut to accept said third string with a cradle clearance of 0.01 mm or 0.001 inches more than said third string seated within said third nut slot, a fourth nut slot cut within said nut to accept said fourth string with a cradle clearance of 0.01 mm or 0.001 inches more than said fourth string seated within said fourth nut slot, a fifth nut slot cut within said nut to accept said fifth string with a cradle clearance of 0.01 mm or 0.001 inches more than said fifth string seated within said fifth nut slot, and a sixth nut slot cut within said nut to accept said sixth string with a cradle clearance of 0.01 mm or 0.001 inches more than said sixth string seated within said sixth nut slot, wherein said nuts slots and said strings prevent buzzing of said strings when played yet secured each said string while allowing said strings to slide freely back and forth for tuning, bending or when using a slide or whammy bar.

11. The six stringed instrument as disclosed in claim 7, said transverse string openings within each respective capstan having a clearance of 0.010 inches of said respective string inserted through each respective transverse string opening.

12. The six stringed instrument of claim 7, further comprising:

said transverse string openings within each respective capstan having a clearance of 0.010 inches of said respective string inserted through each respective transverse string opening; and said six strings defining said first and second strings have a 0.0545±0.01 inch diameter; said third string has a 0.0230±0.01 inch diameter, said fourth string has a 0.0140±0.01 inch diameter, and said fifth and sixth string have a 0.0100±0.01 inch diameter.

* * * * *